United States Patent [19]

Greethead

[11] Patent Number: 4,650,681

[45] Date of Patent: Mar. 17, 1987

[54] BAKERY PRODUCTS

[75] Inventor: Geoffrey F. Greethead, Killara, Australia

[73] Assignee: Jamestown Holdings Pty. Ltd., New South Wales, Australia

[21] Appl. No.: 663,870

[22] Filed: Oct. 23, 1984

[30] Foreign Application Priority Data

Nov. 4, 1983 [AU] Australia ............................ PG2217

[51] Int. Cl.$^4$ ............................................. A23L 1/10
[52] U.S. Cl. ...................... 426/19; 426/549; 426/446; 426/460; 426/622
[58] Field of Search ............... 426/418, 419, 443, 445, 426/446, 450, 552, 622, 463, 549, 19, 21, 460; 241/6, 7

[56] References Cited

U.S. PATENT DOCUMENTS

| | | |
|---|---|---|
| Re. 17,829 | 10/1930 | Dienst ........................................ 241/7 |
| 114,891 | 5/1871 | Watt . |
| 1,178,459 | 4/1916 | Simons ................................ 426/463 |
| 1,493,392 | 5/1924 | Ryle ..................................... 426/622 |
| 2,505,325 | 4/1950 | Hubbard . |
| 2,616,808 | 11/1952 | Roberts . |
| 2,808,333 | 10/1957 | Mickus . |
| 3,162,535 | 12/1964 | Ferrel . |
| 3,701,667 | 10/1972 | Heki . |
| 3,754,930 | 8/1973 | Toei . |
| 3,974,298 | 8/1976 | Cauvain et al. ..................... 426/622 |
| 4,478,862 | 10/1984 | Greethead ........................... 426/450 |
| 4,508,736 | 4/1985 | Bean et al. .......................... 426/622 |

FOREIGN PATENT DOCUMENTS

| | | | |
|---|---|---|---|
| 532158 | 9/1982 | Australia . | |
| 63150 | 4/1984 | Japan ................................ 426/104 |

OTHER PUBLICATIONS

DeGouy 1944 The Bread Tray Greenberg Publisher New York, pp. 170–171.
Lockwood 1962 Flour Milling, Henry Simon Ltd., Stockport, England, pp. 174–175.
Braué 1971 Uncle John's Original Bread Book Pyramid Books, New York, pp. 75 and 85.

*Primary Examiner*—Raymond N. Jones
*Assistant Examiner*—Carolyn Paden
*Attorney, Agent, or Firm*—Ladas & Parry

[57] ABSTRACT

Wholegrain bakery products such as bread or biscuits which incorporate whole grains of cereal such as wheat or rye are made by using heat-treated microporous grain. This avoids extensive pre-soaking required for hydrating natural untreated grain.

8 Claims, No Drawings

BAKERY PRODUCTS

The present invention relates to the use of microporous grain in the production of wholegrain bakery products, such as wholegrain breads, kibbled grain breads, mixed wholemeal and multigrain breads which include wholegrain or partially milled (for example kibbled, chopped, broken, and hulled) grains.

In this specification, the term "grain" is to be taken to include all those grains and seeds which are used in the production of bread and other bakery products. Typical grains include wheat, buckwheat, rye, barley, oats, maize and rice, whilst typical seeds include millet, sesame, linseed, sorghum and rapeseed.

At the present time, there is an increased consumer demand for wholegrain, kibbled grain and mixed grain breads. Many consumers prefer these to wholemeal breads in which the fibrous components of the grain or seed is reduced to a meal so that these fibrous components are not readily perceived by visual examination of the bread. Breads in which individual pieces of grain (whether whole or partial grains) can be clearly seen are preferred, since this represents visual evidence of natural, unmilled grains and seeds in the loaf of bread.

However, this consumer trend has posed serious problems to baker since wholegrains and even broken (usually kibbled, cracked or chopped) grains are difficult to incorporate into bread dough. Because the grain is dense and uncooked it takes up moisture very slowly. This means that if it is incorporated into a bread dough along with the other dough ingredients (usually flour, water and yeast) the grain remains dry and flinty at the completion of the bread baking process. In this dry form, the grain is extremely hard and can only be chewed with great difficulty, so that bread incorporating such dry grain is not readily acceptable.

To overcome this problem, it has been normal to soak the grain in water for a prolonged period to raise its moisture content to around 35–40% (normal grain moisture is 10–12%) prior to incorporation in the dough. A minimum of four hours soaking is required and the preferred method is to put the grain down to soak at the end of the preceding shift so that it has about 16 hours to soak overnight before the next day's baking commences. This, however, requires rigid pre-planning and cannot allow for the effect of unforeseen changes in demand. Also, the amount of space which must be allocated to vessels for soaking the grain is quite considerable.

Additionally, the untreated whole, cracked or kibbled grain contains natural enzymes (in particular, proteases and amylases) which are activated when the grain moisture is raised during pre-soaking and dough making. These enzymes attack the flour components of the dough during fermentation of the dough and frequently make the dough difficult to handle. Typically, the doughs become excessively soft or sticky.

Further, the grain is usually soaked in warm conditions in bakery dough rooms and these warm conditions are highly conducive of the development of microorganisms which can cause spoilage problems in the bread. Many bakers seek to mitigate this problem by the addition of vinegar or acetic acid to the soaking grain. Whilst this suppresses growth of most of the harmful microorganisms, it increases the acidity of the dough and can have adverse effects on dough development during mixing and fermentation.

As a result of these various problems with the use of conventional whole or kibbled grains, it is impossible for large scale bakeries to use their normal highly automated bread making systems. The pre-soaking processes for the grain are labour intensive, time consuming and inflexible, whilst the soaked grain itself does not lend itself to being handled by computer controlled pre-batching and mixing systems.

The present invention seeks to mitigate these disadvantages.

In our Australian patent specification No. 532,158 (80141/82) we disclose a method and apparatus for the production of a microporous rice product. It has now been surprisingly discovered that microporous grains produced by this and other heat treatment processes are eminently suitable for incorporation into wholegrain bakery products without the need for any pre-soaking.

The present invention provides a process for the preparation of a wholegrain bakery product incorporating whole or partial grains, which comprises:
providing heat-treated microporous grain;
mixing the microporous grain with other ingredients of the bakery product and allowing the microporous grain to become hydrated; and
cooking the mixture to form a wholegrain bakery product.

Bread produced by the process is in general indistinguishable from bread produced using conventional grain which has been given prolonged soaking (4–16 hours) before incorporation into the dough.

The grain which has been heat-treated to render it microporous, usually by rapidly heating the grain for a short time period. Generally, the grain is heated to a temperature of 100°–600° C. preferably 130°–300° C. for a time of from 2–30 seconds, preferably 5–20 seconds so as to vapourise water in the grain and produce a microporous product.

Usually, the grain is heated by contacting it with a stream of high temperature gas. It is particularly preferred to employ the cyclone apparatus disclosed in our Australian patent specification No. 532,158 since this produces a highly uniform heat treatment. The apparatus is also relatively inexpensive to build and operate. However, it is not necessary that grain used in the production of bread be heat treated to the same degree of uniformity as the quick cooking rice disclosed in that patent specification. It is not necessary that the grains incorporated into bread be complete homogeneously treated grains. Indeed, a degree of non-uniformity in the grains may be desirable for aesthetic reasons. Thus, it may be possible to produce microporous grains suitable for use in bread making by using any one of a variety of heat treatment processes known in the art of cereal treatment. In particular, acceptable microporous grain may be produced by rapid heat treatment in a fluidised bed heat exchanger, radiant heating tunnel, turbulent flow heating oven, rotary oven, by superheating under pressure followed by rapid expansion to atmospheric or lower pressures, or by treatment with a sufficient intensity of microwave energy.

The microporous structure of the grain is believed to be due to rapid vapourisation of water within the grain itself. This leads to a reduction in density of the grain. However, the expansion is not as great as that of puffed breakfast cereals. Typical density values are given in the table below.

TABLE

| Product | Untreated density | Microporous density | Puffed Cereal density |
| --- | --- | --- | --- |
| Rice | 0.8–0.85 | 0.4–0.6 | 0.07–0.15 |
| Wheat | 0.8–0.85 | 0.4–0.6 | 0.05–0.15 |
| Rye | 0.79–0.84 | 0.3–0.5 | 0.05–0.15 |

In general, the microporous product according to the present invention will have a density of 0.3–0.7 g/ml.

The product will be microporous as the term is understood in the art. Particularly, the grain will have a pore size wherein substantially all the pores fall in the range 0.5–100 microns, usually 0.5–25 microns. However, the majority of the grain will typically have pore sizes in the region 0.5–4 microns. In comparison, the pore size of puffed cereal will generally be at least 200 microns and usually the voids will be clearly visible to the naked eye.

Generally, untreated grain has a water content of 10–16% by weight. However, the rapid evolution of water in the production of the microporous grain leads to a reduction in moisture content, typically to a value of 5–8% by weight. In many instances, it will be desirable to add water to bring the moisture content of the micorporous grain back to its original level. At these moisture contents, the microporous grain is stable and can be stored in bags or in bulk for extended periods of time. The treated grain thus lends itself readily to use in automated bread bakeries.

The microporous grain is generally in a substantially gelatinised form such that the grain rapidly takes up water when it is soaked and becomes soft and easy to chew. When incorporated into the dough and cooked, the grain pieces maintain their structural integrity.

It is also found that the heat treatment of the grain inactivates the enzymes, thus avoiding difficulties in the subsequent bread making process.

The microporous grain may be used in the production of wholegrain bread or any other bakery products which include whole or part grains, such as biscuits, muffins, crispbreads, extruded crispbread, cookies, snacks and health food bars.

In order to assist in the uptake of water and subsequent cooking, the microporous grain may be disrupted, for example by passing through bumping rollers or chopping mills. The microporous grain may be used as essentially whole grains or may be subjected to cracking, chopping, (kibbling), rolling or other form of size reduction as required for the particular type of bread being produced.

The microporous grain takes up water very rapidly. Typically, the moisture content can be raised to 35–40% by weight in a time period of 30 seconds to 5 minutes. This hydrated grain cooks to a soft, easily chewed consistency when subjected to the normal dough making and baking procedures. Loaves of bread incorporating the grain can be readily sliced without tearing of the crumb, which occurs if the grain is insufficiently soft.

The microporous grain can be incorporated without the necessity for any changes in the conventional bread making procedure. In a preferred method, the microporous grain is mixed with water in a mixing vessel and left to stand for 30 seconds or more before addition of the other ingredients. The bread may be produced by any of the bread making procedures known in the art.

These extremely short hydration times do not allow an opportunity for proliferation of microorganisms, thus overcoming the hygiene problems associated with prolonged soaking and eliminating the need for additives such as vinegar or acetic acid.

In a typical procedure, microporous grain is metered or batch-measured into a dough mixing plant. The necessary amount of water to raise its moisture content to the desired level (typically 35–40% by weight) is added and the grain mixed for 30 seconds to 5 minutes to absorb the water. The remaining ingredients (usually flour, water and yeast) are then metered into the mixing system and the dough is developed, fermented, divided, proofed and baked in the normal way. Because the natural grain enzymes have been inactivated by the heat treatment, no problems occur in the dough handling steps. Whole grain bread produced in this way is essentially indistinguishable from bread produced from pre-soaked conventional grain, although subtle differences in texture and taste may be perceivable.

The present invention will now be described by way of example only in the following examples.

EXAMPLE 1

(Production of Microporous Wheat)

An apparatus as described in Australian patent specification No. 532,158 and comprising three cyclones arranged in series was employed to heat-treat cleaned prime hard wheat to produce a microporous product. Gas emenated from the furnace at a temperature of about 510° C. The throughput of wheat was substantially 400 kg per hour and the total treatment time in the three cyclones was about 15 seconds. The density of the treated grain was substantially 0.5 g/ml (initial density 0.8 g/ml) and the moisture content was about 5% by weight (initial value 12% by weight). Moisture content of the treated wheat was raised to 11 weight % by addition of water to the treated grain in a continuous mixer.

The treated grain was bumped by passing it between rollers set with a clearance about half the mean diameter of the treated grains. This caused the grains to break up to about the same degree as found in kibbled, untreated wheat.

The treated wheat and untreated kibbled wheat (as control) were made into bread as follows.

EXAMPLE 2

A. Control—Kibbled Wheat

Grain Ratio: 70 parts flour:30 parts kibbled wheat.

Treatment: Kibbled wheat pre-mixed with 60% of total water needed for dough. Grain soaked in mixer bowl for 4 hours. Flour, remaining water, yeast, shortening, salt and bread improvers added to soaked wheat and dough mixed for 8.5 minutes, in a medium intensity mixer.

B. Invention—Treated Wheat

Grain Ratio: 70 parts flour:30 parts microporous wheat

Treatment: Microporous wheat, and the total water needed for the dough were placed in the mixer bowl and mixed for two minutes. Flour, yeast, shortening, salt and bread improvers were added to the wetted grain and mixed for 8.5 minutes in a medium intensity mixer to form the dough.

From this point, both doughs were treated identically as follows:

Dough fermentation 10 mins. at 28°–30° C. (rapid dough method)
Divided into dough pieces (correct size for final loaves)
Relaxed for 10 mins. at 28°–30° C.
Moulded into loaves
Panned into baking pans
Proofed (fermented) for 50 mins. at 38° C. and 90% humidity
Baked 30 mins. at 250°–255° C.

Results

The quality of the loaves made from the microporous wheat was comparable in all respects to those made from the soaked, kibbled grain.

EXAMPLE 3

(Wholegrain Biscuits)

The following ingredients were mixed together and cooked to form biscuits:

|  | wt % |
| --- | --- |
| Fine Gristed Wheat Flour | 18.05 |
| Fine Gristed Malted Wheat Flour | 18.05 |
| Heavy Bump Microporous Wheat | 16.24 |
| Margarine | 25.27 |
| Raw Suage | 18.05 |
| Water | 3.61 |
| Vanilla | 0.70 |
| Salt | 0.03 |

The fine gristed wheat flour was formed by milling microporous wheat to form an "aerated flour" which avoided the need for a conventional expanding agent (e.g. sodium bicarbonate or ammonium carbonate) and allowed a relatively low fat content. The microporous wholegrain imparted a pleasant chewy texture.

I claim:

1. A process for the preparation of a wholegrain bakery product incorporating whole or partial grains, which comprises:

heat-treating whole or partial grains at a temperature and for a period of time sufficient to vaporize water in the grain, thereby producing a microporous grain;

hydrating the microporous grain by addition of water thereto; mixing the hydrated microporous grain with other bakery-making ingredients; and cooking the mixture to form a wholegrain bakery product.

2. A process according to claim 1 wherein said bakery product is wholegrain bread, and said process comprises adding water to the microporous grain and leaving for 30 seconds to 5 minutes to allow the microporous grain to be hydrated; adding remaining bread-making ingredients and forming a dough; and fermenting, dividing and baking the dough to form a wholegrain bread.

3. A process according to claim 1 wherein the bakery product is a biscuit.

4. A process according to claim 1 wherein the microporous grain has a density of 0.3 to 0.7.

5. A process according to claim 1 wherein the microporous grain is such that substantially all the pores of the microporous grain fall in the range 0.5 to 100 microns.

6. A process according to claim 1 wherein the microporous grain has a moisture content of 5 to 8 wt%.

7. A process according to claim 1 wherein the grain is microporous wheat of density 0.4 to 0.6, or microporous rye of density 0.3 to 0.5.

8. A process according to claim 1 wherein the microporous grain has been disrupted.

* * * * *